United States Patent
Fujishiro

(10) Patent No.: US 6,757,508 B2
(45) Date of Patent: Jun. 29, 2004

(54) IMAGE CARRIER AND DAMPING MEMBER THEREFOR

(75) Inventor: Takatsugu Fujishiro, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/145,899

(22) Filed: May 16, 2002

(65) Prior Publication Data

US 2002/0186985 A1 Dec. 12, 2002

(30) Foreign Application Priority Data

May 23, 2001 (JP) .......................................... 2001-153269
Nov. 29, 2001 (JP) .......................................... 2001-365058

(51) Int. Cl.[7] ........................ G03G 15/00; G03G 21/00
(52) U.S. Cl. ........................ 399/159; 188/378; 399/91; 399/116
(58) Field of Search ................................ 399/159, 116, 399/117, 107, 91, 170; 492/18, 47; 188/378, 379

(56) References Cited

U.S. PATENT DOCUMENTS

| | | | | |
|---|---|---|---|---|
| 4,483,426 A | * | 11/1984 | Tagawa et al. | 188/378 |
| 4,672,505 A | * | 6/1987 | Tsuchiya et al. | 399/170 X |
| 5,339,141 A | | 8/1994 | Suzuki et al. | 399/285 |
| 5,350,610 A | | 9/1994 | Mashita et al. | 428/35.7 |
| 5,424,814 A | | 6/1995 | Suzuki et al. | 399/284 |
| 5,430,526 A | * | 7/1995 | Ohkubo et al. | 399/159 |
| 5,440,373 A | | 8/1995 | Deki et al. | 399/113 |
| 5,512,984 A | | 4/1996 | Kimura et al. | 399/228 |
| 5,515,145 A | | 5/1996 | Sasaki et al. | 399/302 |
| 5,537,197 A | | 7/1996 | Fujishiro et al. | 399/228 |
| 5,565,961 A | | 10/1996 | Shoji et al. | 399/111 |
| 5,565,973 A | | 10/1996 | Fujishiro et al. | 399/227 |
| 5,583,630 A | | 12/1996 | Kimura et al. | 399/227 |
| 5,621,221 A | | 4/1997 | Shinohara et al. | 250/576 |
| 5,655,193 A | | 8/1997 | Fujishiro et al. | 399/256 |
| 5,671,465 A | | 9/1997 | Kimura et al. | 399/119 |
| 5,737,665 A | | 4/1998 | Sugiyama et al. | 399/39 |
| 5,765,083 A | | 6/1998 | Shinohara | 399/301 |
| 5,875,380 A | | 2/1999 | Iwata et al. | 399/301 |
| 5,899,597 A | | 5/1999 | Shinohara et al. | 399/64 |
| 5,950,044 A | * | 9/1999 | Ashiya et al. | 399/159 X |
| 5,953,568 A | | 9/1999 | Fujishiro et al. | 399/267 |
| 5,962,783 A | | 10/1999 | Iwata et al. | 73/488 |
| 5,963,240 A | | 10/1999 | Shinohara et al. | 347/116 |
| 5,991,573 A | * | 11/1999 | Nohsho et al. | 399/159 |

(List continued on next page.)

FOREIGN PATENT DOCUMENTS

| | | | |
|---|---|---|---|
| EP | 0 698 829 | | 2/1996 |
| JP | 63-60481 | | 3/1988 |
| JP | 3-105348 | | 5/1991 |
| JP | 4-159571 | | 6/1992 |
| JP | 5-35167 | | 2/1993 |
| JP | 05-188840 | * | 7/1993 |
| JP | 5-197321 | | 8/1993 |
| JP | 08-202206 | * | 8/1996 |
| JP | 9-226057 | | 9/1997 |
| JP | 10-268703 | * | 10/1998 |
| JP | 11-194518 | | 7/1999 |
| JP | 11-349737 | * | 12/1999 |
| JP | 2002-078834 | * | 3/2002 |

Primary Examiner—Sophia S. Chen
(74) Attorney, Agent, or Firm—Oblon, Spivak, McClelland, Maier & Neustadt, P.C.

(57) ABSTRACT

A damping member is fitted in the hollow cylindrical core of a photoconductive drum. The damping member is implemented as a hollow cylinder having one end thereof closed by an end wall. A jig is inserted into the damping member and caused to insert the damping member into the drum by pressing the end wall. The damping member is therefore easily fitted in the drum. The damping member is formed of an elastic material for damping vibration.

50 Claims, 12 Drawing Sheets

U.S. PATENT DOCUMENTS

| | | | |
|---|---|---|---|
| 6,070,030 A | | 5/2000 | Fujishiro .................... 399/111 |
| 6,075,955 A | * | 6/2000 | Cais et al. .................... 399/91 |
| 6,097,914 A | * | 8/2000 | Tanaka et al. ............... 399/159 |
| 6,118,557 A | | 9/2000 | Sugiyama et al. .......... 358/504 |
| 6,122,468 A | | 9/2000 | Sakamoto et al. .......... 399/223 |
| 6,128,459 A | | 10/2000 | Iwata et al. ................. 399/301 |
| 6,131,003 A | | 10/2000 | Cais et al. .................... 399/91 |
| 6,245,473 B1 | * | 6/2001 | Anayama et al. ....... 399/159 X |
| 6,249,304 B1 | | 6/2001 | Sawayama et al. ......... 347/228 |
| 6,282,396 B1 | | 8/2001 | Iwata et al. ................. 399/301 |
| 6,295,435 B1 | | 9/2001 | Shinohara et al. .......... 399/301 |
| 6,295,438 B1 | | 9/2001 | Fujishiro et al. ............ 399/346 |
| 6,308,027 B1 | | 10/2001 | Obu et al. ................... 399/110 |
| 6,366,751 B1 | * | 4/2002 | Shakuto et al. ............. 399/159 |
| 6,380,960 B1 | | 4/2002 | Shinohara ................... 347/116 |
| 6,381,435 B2 | | 4/2002 | Shinohara et al. .......... 399/301 |
| 6,406,656 B1 | * | 6/2002 | Thompson et al. ..... 399/159 X |
| 6,439,359 B1 | * | 8/2002 | Kato et al. .................. 188/379 |
| 6,470,158 B2 | * | 10/2002 | Fritz et al. .................... 399/91 |
| 2001/0039310 A1 | * | 11/2001 | Nomura et al. ............... 525/95 |
| 2002/0141781 A1 | * | 10/2002 | Litman et al. .............. 399/159 |

* cited by examiner

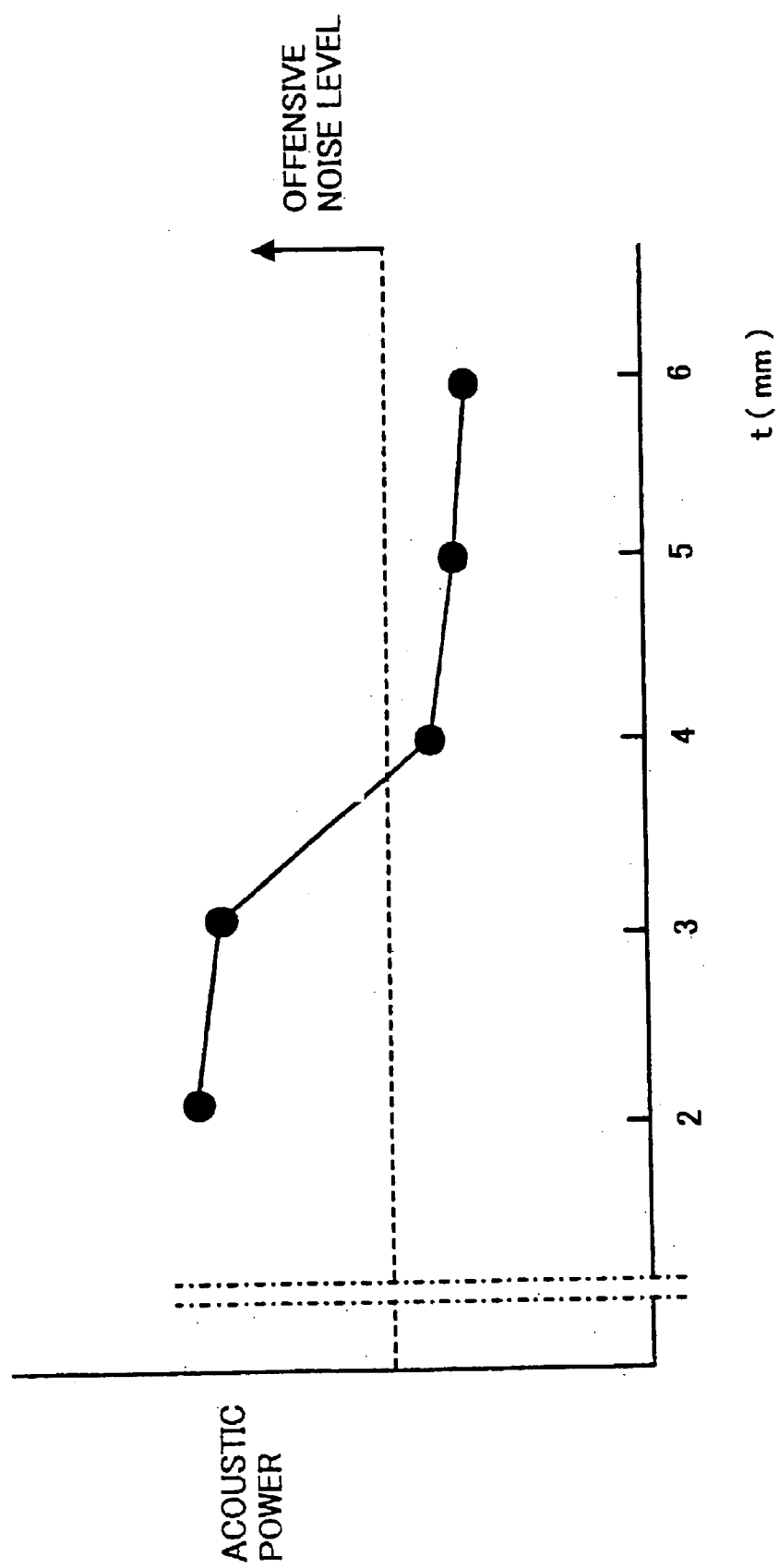

FIG. 18

| SAMPLE | DRUM No. | INITIAL STAGE | | | | 100,000 PRINTS | | | | 200,000 PRINTS | | | |
|---|---|---|---|---|---|---|---|---|---|---|---|---|---|
| | | NITRIC ACID ION DEPOSITION | F/C | Δd (μm) | IMAGE QUALITY | NITRIC ACID ION DEPOSITION | F/C | Δd (μm) | IMAGE QUALITY | NITRIC ACID ION DEPOSITION | F/C | Δd (μm) | IMAGE QUALITY |
| EX. 1 | 1 | 50 | 0 | 0.0 | ○ | 80 | 0.00 | 8.0 | ○ | 80 | 0.00 | 15.0 | △2 |
| EX. 2 | 2 | 50 | 0 | 0.0 | ○ | 70 | 0.00 | 7.0 | ○ | 80 | 0.00 | 14.0 | △2 |
| COMP. EX. 1 | 1 | 50 | 0 | 0.0 | ○ | 350 | 0.00 | 0.2 | ×3 | 450 | 0.00 | 0.5 | ×3 |
| COMP. EX. 2 | 2 | 50 | 0 | 0.0 | ○ | 350 | 0.00 | 0.2 | ×3 | 470 | 0.00 | 0.4 | ×3 |
| COMP. EX. 3 | 1 | 50 | 0 | 0.0 | ○ | 30 | 0.00 | 12.0 | △2 | 30 | 0.00 | 23.0 | ×2 |
| COMP. EX. 4 | 2 | 50 | 0 | 0.0 | ○ | 30 | 0.00 | 13.0 | △2 | 30 | 0.00 | 24.0 | ×2 |
| EX. 3 | 1 | 50 | 0 | 0.0 | ○ | 150 | 0.25 | 1.0 | ○ | 200 | 0.28 | 2.0 | ○ |
| EX. 4 | 2 | 50 | 0 | 0.0 | ○ | 180 | 0.26 | 0.9 | ○ | 220 | 0.29 | 2.0 | ○ |
| COMP. EX. 5 | 1 | 50 | 0 | 0.0 | ○ | 100 | 0.03 | 7.0 | ○ | 120 | 0.03 | 13.0 | △2 |
| COMP. EX. 6 | 2 | 50 | 0 | 0.0 | ○ | 80 | 0.03 | 7.0 | ○ | 100 | 0.03 | 13.0 | △2 |
| COMP. EX. 7 | 1 | 50 | 0 | 0.0 | ○ | 400 | 0.55 | 0.2 | ×3 | 500 | 0.60 | 0.6 | ×3 |
| COMP. EX. 8 | 2 | 50 | 0 | 0.0 | ○ | 450 | 0.60 | 0.2 | ×3 | 550 | 0.62 | 0.5 | ×3 |
| EX. 5 | 1 | 50 | 0 | 0.0 | ○ | 160 | 0.26 | 0.9 | ○ | 180 | 0.28 | 2.0 | ○ |
| EX. 6 | 2 | 50 | 0 | 0.0 | ○ | 160 | 0.26 | 1.0 | ○ | 200 | 0.27 | 2.2 | ○ |
| COMP. EX. 9 | 1 | 50 | 0 | 0.0 | ○ | 80 | 0.03 | 8.0 | ○ | 100 | 0.03 | 15.0 | △2 |
| COMP. EX. 10 | 2 | 50 | 0 | 0.0 | ○ | 70 | 0.03 | 7.0 | ○ | 90 | 0.03 | 15.0 | △2 |
| COMP. EX. 11 | 1 | 50 | 0 | 0.0 | ○ | 500 | 0.60 | 0.2 | ×3 | 580 | 0.64 | 0.5 | ×3 |
| COMP. EX. 12 | 2 | 50 | 0 | 0.0 | ○ | 550 | 0.62 | 0.2 | ×3 | 600 | 0.62 | 0.4 | ×3 |

IMAGE CARRIER AND DAMPING MEMBER THEREFOR

BACKGROUND OF THE INVENTION

1. Field of the Invention

The present invention relates to an electrophotographic image forming apparatus and an image carrier included therein and more particularly to a damping member fitted in the image carrier for reducing noise ascribable to the image carrier.

2. Description of the Background Art

It is a common practice with a copier, facsimile apparatus, printer or similar electrophotographic image forming apparatus to uniformly charge a photoconductive drum or similar image carrier with a charger. The charger is implemented as either one of a non-contact type charger and a contact type charger.

The non-contact type charger is a corona charger including a charge wire and spaced from the drum. A high voltage is applied to the charge wire for charging the drum by corona discharge. The problem with the corona charger is that it produces ozone, nitrogen oxides and other discharge products that pollute the environment. For this reason, the contact type charger is predominant over the non-contact type charger.

The contact type charger includes a conductive roller, brush, blade or similar charging member held in contact with the drum. A voltage is applied between the charging member and the drum for injecting a charge in the drum. While this type of charger needs only a low voltage and produces no toxic discharge products, the charger is apt to allow toner and impurities deposited on the drum to deposit on the charger. Moreover, when the charging member is left in contact with the drum over a long period of time, part of the charging member contacting the drum is apt to permanently deform. If the charging member contacts the drum in an unexpected manner, then it fails to uniformly charge the drum later.

In light of the above, it has been proposed to form a preselected small gap between the drum and a charging member for thereby forming a non-contact charging range between the drum and the charging member (proximity type charging system). The proximity type charging system, which is the intermediate between the contact type system and the non-contact type system, uses a brush, roller brush, roller blade, belt or similar charging member having adequate conductivity and adequate elasticity. A small gap is formed between the charging member and the drum. An AC-biased DC voltage is applied between the charging member and the drum. For example, when the charging member is implemented as a roller, films with preselected thickness may be wrapped around opposite ends portions of the charge roller, forming the small gap.

The prerequisite with the proximity type charging system is that the small gap has a preselected dimension so as not to vary charging characteristics. More specifically, so long as the small gap has the preselected dimension, a DC voltage easy to set suffices for uniform charging. However, if the gap is greater than preselected one, then the charge potential varies along with the gap. To solve this problem, it has been customary to superpose an AC voltage on a DC voltage for thereby insuring uniform charging even when the gap varies.

The drum includes a conductive core implemented as a hollow cylinder and formed of a relatively light material, e.g., aluminum. This kind of drum sometimes generates noise during image forming operation. More specifically, various units for executing an image forming process, which include charging, optical writing, development, image transfer and cleaning, face the drum. A charger and a cleaning unit, in particular, often constitute the source of noise of the drum.

The AC voltage superposed on the DC voltage, as stated earlier, is likely to cause the thin, hollow cylindrical core of the drum to resonate. Noise ascribable to the resonation is transferred to arrangements around the drum. As for a cleaning unit of the type using a cleaning blade, the cleaning belt held in contact with the drum is repeatedly pulled by the drum in rotation and restored to the original position, vibrating at the thin, cylindrical core of the drum. As a result, the drum resonates and produces noise.

To reduce noise stated above, Japanese Laid-Open Publication No. 7-72641, for example, proposes a photoconductive drum including a solid core, e.g., a cylindrical or columnar, rigid core. However, a problem with this scheme is that the solid metallic core increases the cost and makes the drum extremely heavy. The user is therefore apt to drop the drum or damage the surface of the drum at the time of replacement.

Japanese Patent Laid-Open Publication No. 11-184308 teaches a photoconductive drum in which two or more elastic bodies and cylindrical bodies are fitted. Such sophisticated damping members, however, increase the cost of the drum.

Technologies relating to the present invention are also disclosed in, e.g., Japanese Patent Laid-Open Publication Nos. 3-105348 (Japanese Patent No. 2,913,689), 5-35167, 5-197321 and 11-194518.

SUMMARY OF THE INVENTION

It is an object of the present invention to provide an image carrier producing a minimum of noise when implemented as a hollow cylinder with a thin wall, and an image forming apparatus using the same.

It is another object of the present invention to provide a damping member for preventing an image carrier from resonating and producing noise.

In accordance with the present invention, an image carrier is included in an image forming apparatus that uniformly charges the photoconductive layer of the image carrier and then electrostatically forms a latent image on the photoconductive layer with a light beam. The image carrier includes a hollow cylindrical core having a thin wall and on which the photoconductive layer is formed. A damping member is fitted in the bore of the core and formed of an elastic material having a loss tangent tan δ of 0.5 or above.

BRIEF DESCRIPTION OF THE DRAWINGS

The above and other objects, features and advantages of the present invention will become more apparent from the following detailed description taken with the accompanying drawings in which:

FIG. 8 is a graph showing how a damping effect varies with the wall thickness of a hollow cylindrical damping member;

FIG. 18 is a table listing the results of experiments conducted with examples and comparative examples.

DESCRIPTION OF THE PREFERRED EMBODIMENTS

Figure 1:
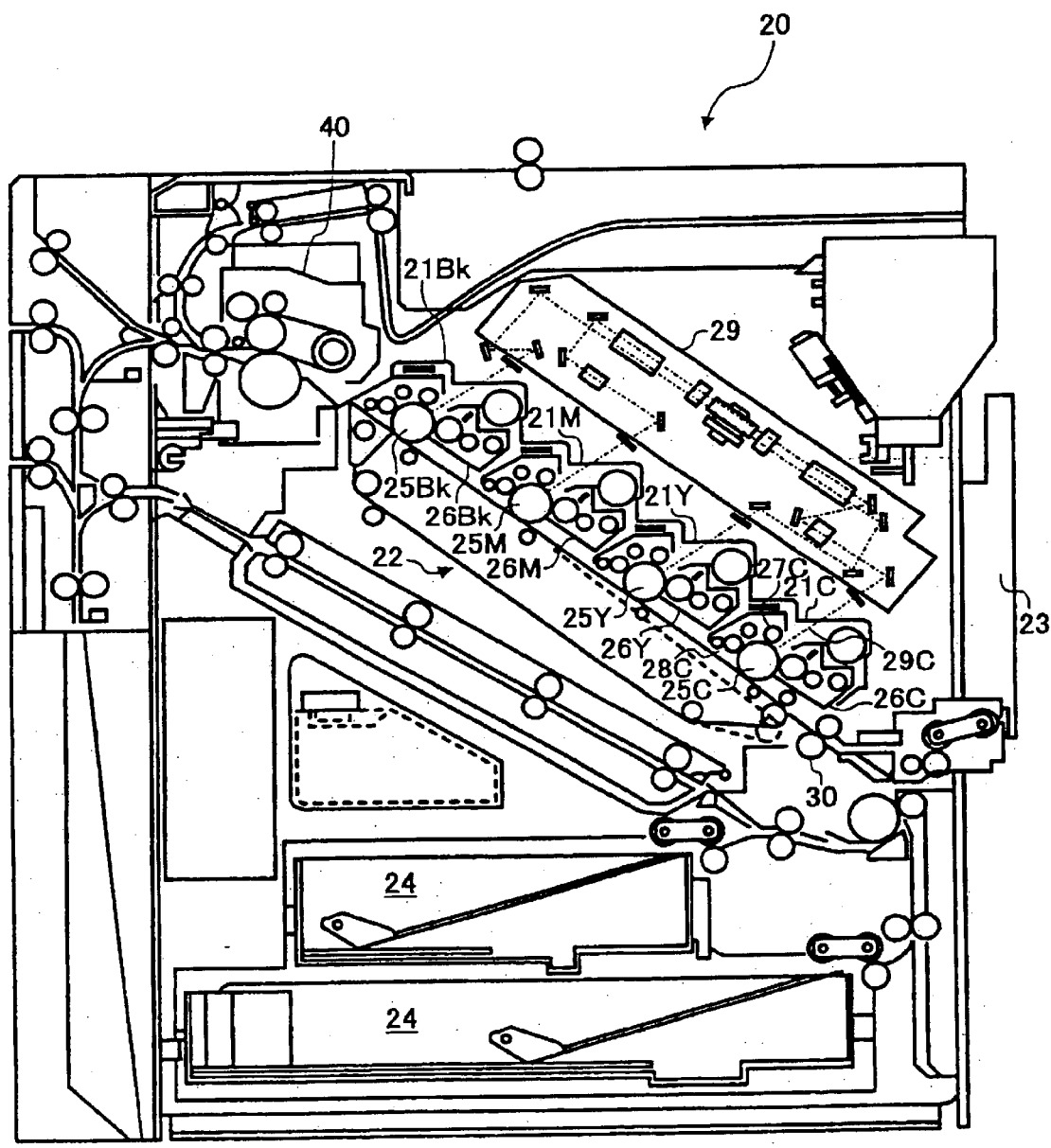
FIG. 1 is a view showing a full-color image forming apparatus to which the present invention is applied.

Referring to FIG. 1 of the drawings, a full-color image forming apparatus to which the present invention is applied is shown and generally designated by the reference numeral 20. As shown, the image forming apparatus 20 includes four image forming devices 21C (cyan), 21Y (yellow), 21M (magenta) and 21BK (black). An image transferring device 22 faces the image forming devices 21C through 21BK. A sheet or recording medium is fed from either one of a manual feed tray 23 and cassettes 24, which constitute recording medium feeding means, to a registration rollerpair 30. The registration roller pair 30 conveys the sheet to consecutive image transfer positions where the image forming devices 21C through 21BK and image transferring device 22 face each other at preselected timing. A fixing device 40 fixes a toner image transferred to the sheet.

The image forming apparatus 20 can deal with any one of plain paper sheets customary with, e.g., copiers, and special sheets greater in thermal capacity than paper sheets. The special sheets include OHP (OverHead Projector) sheets, cards, postcards and other thick sheets (90 K; 100 g/m$^2$), and envelopes.

The image forming devices 21C through 21BK store cyan toner, yellow toner, magenta toner, and black toner, respectively, and are identical in configuration. Let the following description concentrate on the image forming device 21C by way of example. Corresponding descriptions apply to corresponding elements 25Y, 25M, 25Bk, 26Y, 26M, and 26Bk for the image forming devices 21Y, 21M and 21BK.

The image forming device 21C includes a photoconductive drum or image carrier 25C implemented as a hollow cylinder that has an outside diameter of 30 mm, an inside diameter of 28.5 mm, and a wall thickness of 0.75 mm. The drum 25C is rotatable in a direction indicated by an arrow A in FIG. 2. A charger 27C, a developing device 26C, and a cleaning device 28C are sequentially arranged around the drum 25C in this order in the direction A. FIG. 1 also illustrates an optical unit 29 for writing a light beam on the photoconductive drums or image carriers 25Bk, 25M, 25Y, and 25C. A light beam 29C scans the drum 25C between the charger 27C and the developing device 26C. The image transferring device 20 extends in an inclined position and occupies a minimum of space in the horizontal direction.

Figure 2:
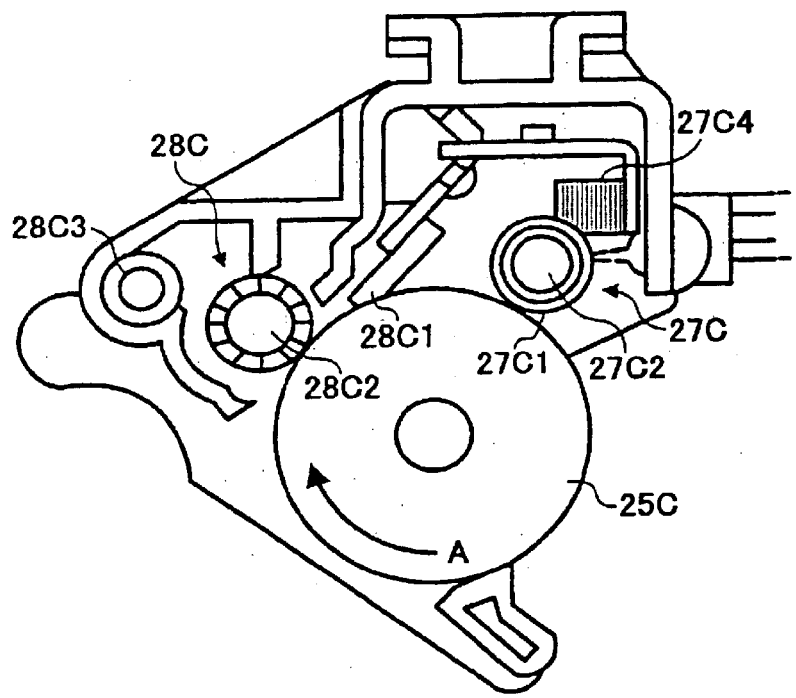
FIG. 2 is an enlarged view showing an image forming device included in the apparatus of FIG. 1.

As shown in FIG. 2, the image forming device 21C is constructed into a unit or process cartridge removably mounted on the image forming apparatus 20. The four image forming devices 21C through 21BK can be integrally pulled out of the image forming apparatus 20, as needed.

Figure 3:
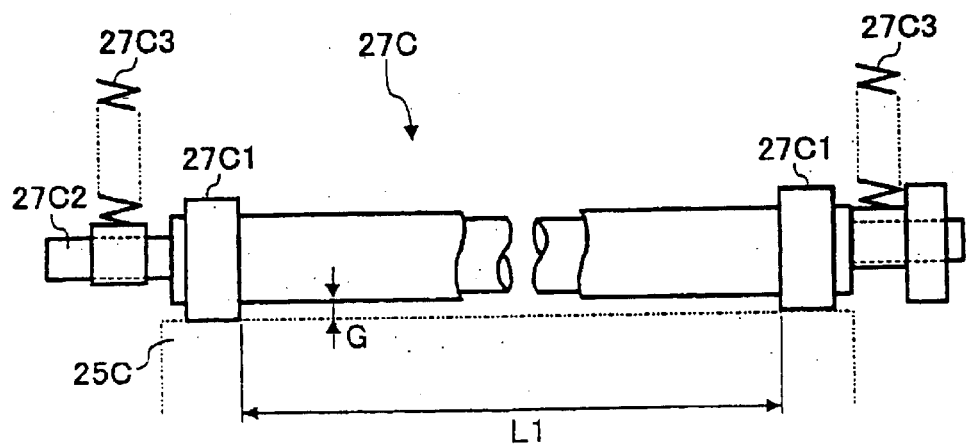
FIG. 3 is a front view showing a charger included in the device of FIG. 2.

As shown in FIG. 3, the charger 27C includes a core 27C2 and films 27C1 wrapped around opposite end portions of the core. The films 27C1 form a preselected small gap between the core and the drum 25C. Springs 27C3 constantly bias the charger 27C toward the drum 25C, so that the films 27C1 contact the drum 25C and form a gap G between the charger 27C and the drum 25C. A DC voltage of –700 V, for example, is applied to the core constant voltage control. At the same time, an AC voltage is applied to the core by constant current control. In this condition, the charger 27C uniformly charges the surface of the drum 25C via the gap G by gaseous discharge.

As shown in FIG. 2, the cleaning device 28C includes a cleaning blade 28C1 contacting the drum 25C for removing toner left on the drum 25C. A brush 28C2 collects the toner from the cleaning blade 28C1. A screw auger or waste toner conveying means 28C3 conveys the toner collected by the brush 28C to a waste toner storing section not shown.

A cleaning mechanism is also assigned to the charger 27C and includes pads 27C4 (only one is visible) that contact the films 27C1 wrapped around the core. The cleaning mechanism prevents toner and impurities deposited on the drum 25C from being transferred to the films 27C1, which constantly contact the drum 25C. This successfully maintains the films 27C1 and drum 25C in contact in a preselected condition and thereby maintains the gap between the drum 25C and the charger 27C constant.

Figure 4:
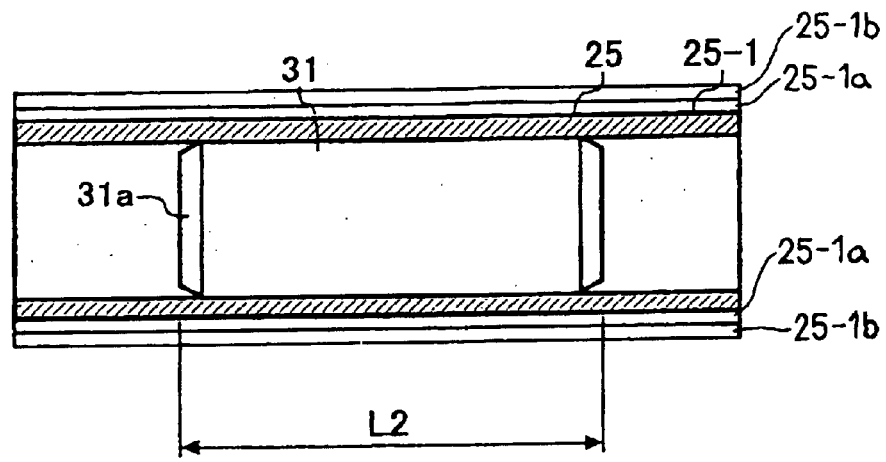
FIG. 4 is a section showing a first embodiment of the photoconductive drum in accordance with the present invention.
Figure 5:
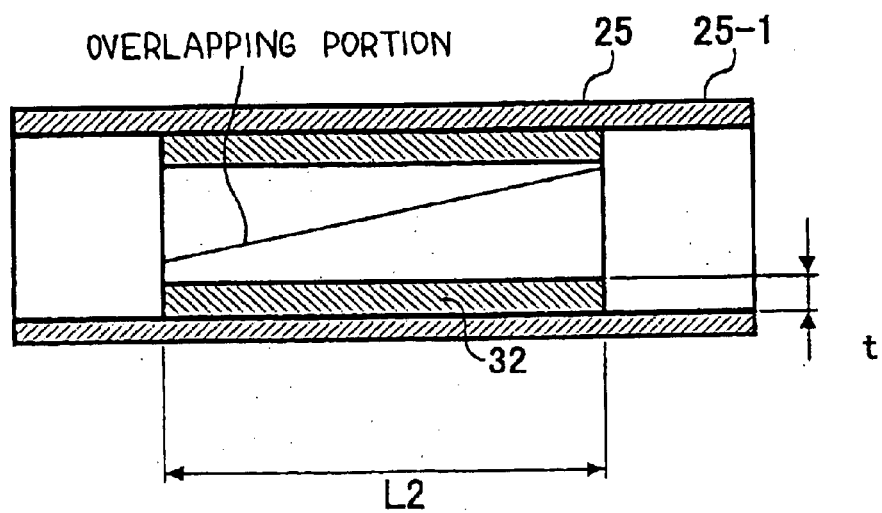
FIG. 5 is a section showing a second embodiment of the photoconductive drum in accordance with the present invention.

FIG. 4 shows a first embodiment of the photoconductive drum or image carrier in accordance with the present invention. The drum, labeled 25 (25C), is provided with a measure against noise. As shown, the drum 25 is made up of a hollow cylinder 25-1 whose wall thickness is as small as 0.75 mm and a photoconductive layer formed on the cylinder 25-1. A cylindrical, solid damping member 31 for damping vibration is received in the bore of the cylinder 25-1. FIG. 5 shows a second embodiment of the present invention in which the damping member 31 is implemented as a hollow cylinder.

The damping members 31 and 32 each may be formed of butyl rubber, nitrile rubber or similar rubber, resin or metal. Any one of such materials damps vibration with elasticity particular thereto. Also, the damping member 31 or 32 increases the weight of the drum 25 and thereby shifts the resonance frequency of the drum 25 itself to the low frequency side. This effectively reduces offensive high-frequency noise.

A loss tangent tan δ relating to the damping effect available with the damping member 31 or 32 will be described hereinafter. A loss tangent tan δ refers to the tangent of the phase angle (loss angle) δ of stress and strain particular to a given material. The loss tangent is a value particular to a material and representative of a damping effect available with the material. Therefore, the greater the loss tangent tan δ, the greater the damping effect.

Figure 6:
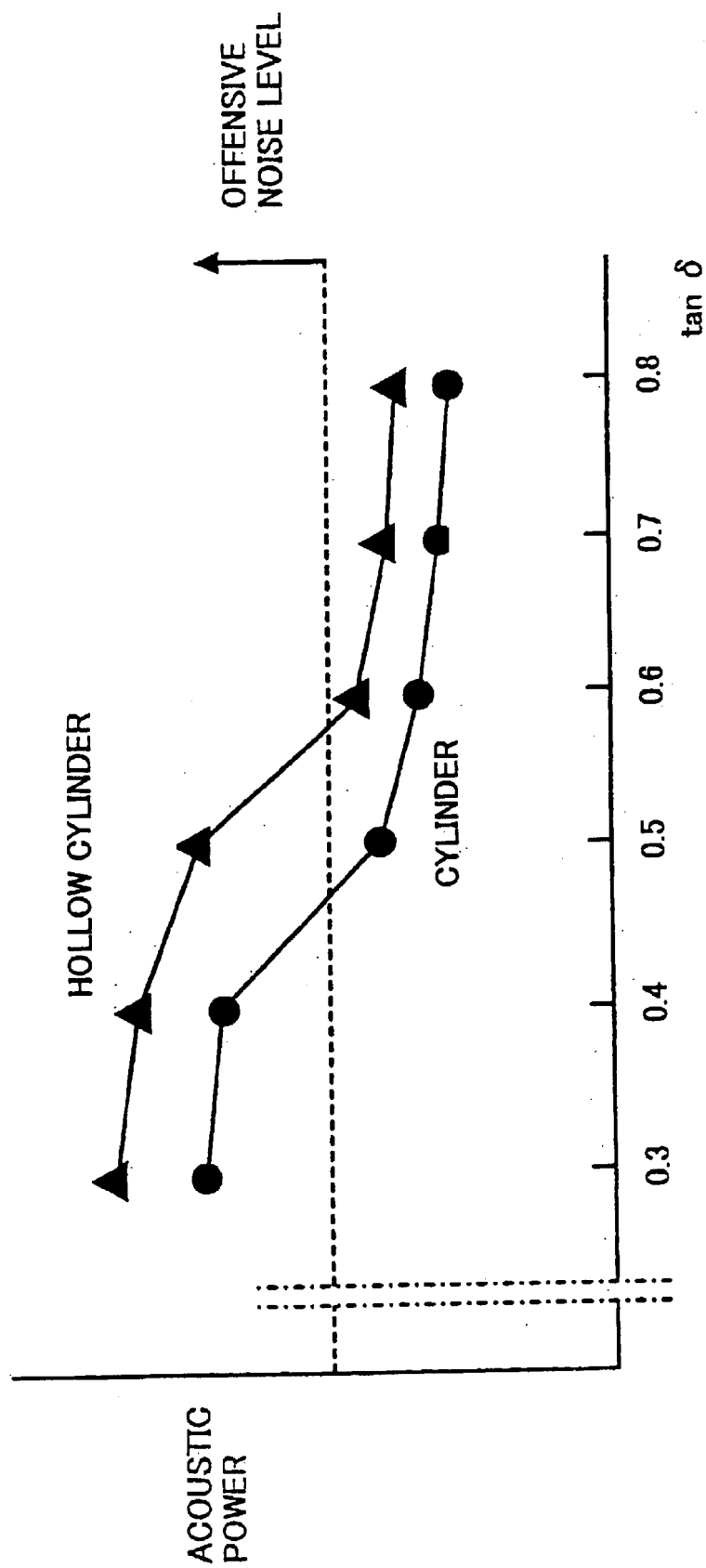
FIG. 6 is a graph showing how a damping effect varies with the loss tangent of a damping member.

For experiments, cylindrical or hollow cylindrical damping members formed of various materials different in loss tangent tan δ were fitted in the bore of the drum 25 shown in FIG. 2. Acoustic power was measured by applying an AC-biased DC voltage to the charge roller 27 with such damping members. FIG. 6 shows the results of experiments; the ordinate and abscissa indicate acoustic power and loss tangent tan δ, respectively. To measure loss tangents tan δ, use was made of a non-resonant vibration method as prescribed by JIS (Japanese Industrial Standards) K7244-4. The samples each were 2 mm thick, 5 mm wide and 30 mm long. Measurement was effected at a frequency of 30 Hz.

As FIG. 6 indicates, cylindrical damping members with tan δ of 0.5 or above reduced vibration to a non-offensive level while hollow cylindrical damping members with tan δ of 0.6 or above exhibited the same damping effect. Tan δ of 0.8 or above further enhanced the damping effect. A cylindrical damping member can damp noise with smaller tan δ than a hollow cylindrical damping member for the following reason. A cylindrical damping member is heavier than a hollow cylindrical damping member and therefore shifts the resonance frequency of the drum 25 more to the low frequency side, thereby effectively reducing offensive high-frequency noise.

As stated above, a cylindrical damping member with tan δ of 0.5 or above and a hollow cylindrical damping member with tan δ of 0.6 or above can damp vibration to an acceptable degree. The damping effect is further enhanced when tan δ is 0.8 or above. This is successful to damp vibration (noise) ascribable to the charger 27 or the cleaning blade 28C1. This is, of course, true with the other drums 25Y, 25M and 25BK.

When a metal rod or similar rigid body is inserted in the hollow cylindrical damping member 32, it increases the weight of the damping member 32 and thereby further enhances the damping effect. This configuration is equivalent to one in which a rigid body is disposed in the drum 25 with the intermediary of an elastic body (damping member 32).

The hollow cylindrical damping member may be implemented as an elastic round sheet, which is inexpensive and therefore reduces the cost of the damping member. In addition, the elastic round sheet can be easily mounted to the drum 25. Preferably, as shown in FIG. 5, the seam or the overlapping portion of the elastic sheet should not be parallel to the axis of the hollow cylinder so as to protect the drum 25 from deformation; otherwise, pressure ascribable to the edges of the sheet might act on the drum 25 in the up-and-down direction and deform the drum 25.

Figure 7:
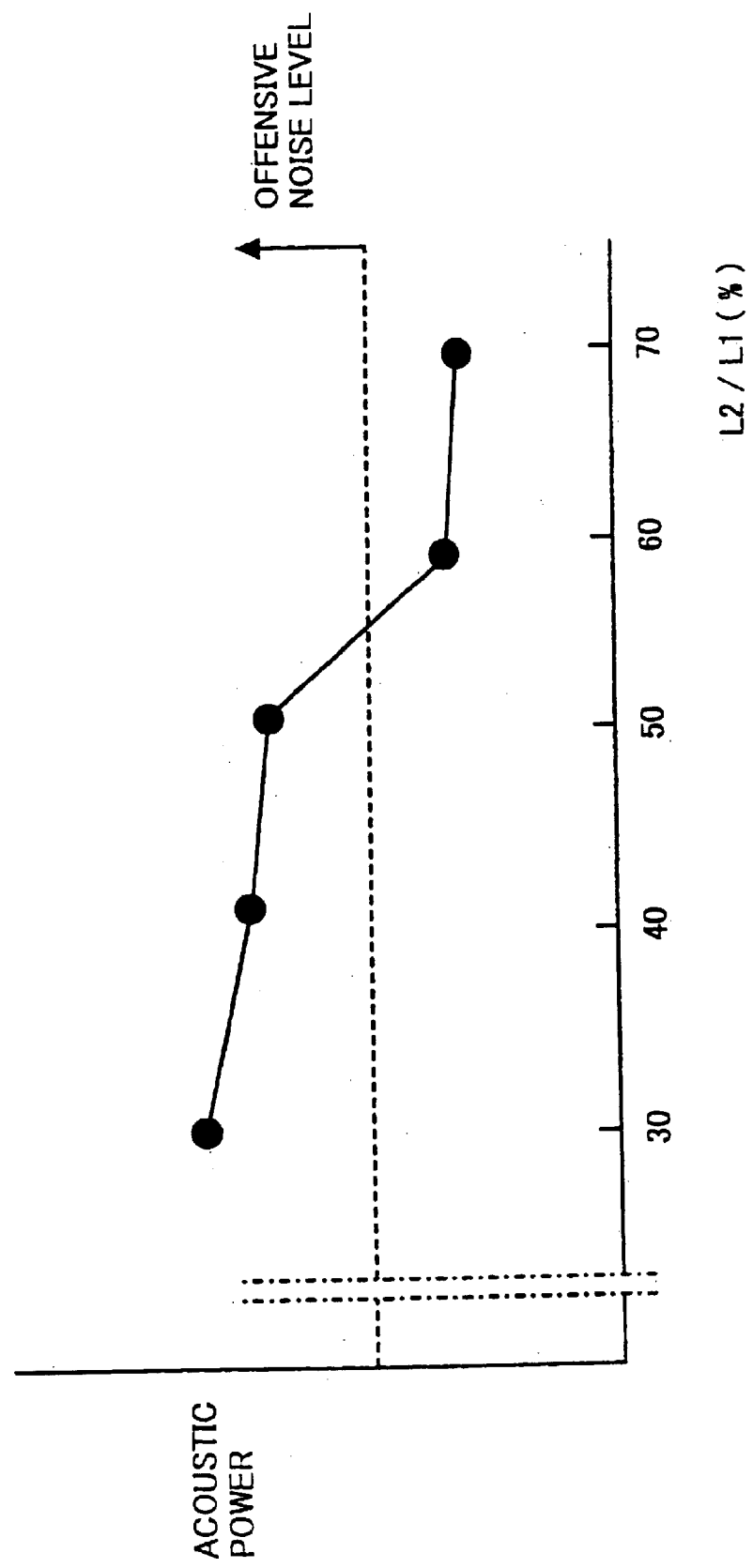
FIG. 7 is a graph showing how a damping effect varies with the axial length of a damping member.

FIG. 7 shows a relation between acoustic power and tan δ determined by varying the axial dimension L2 (see FIGS. 4 and 5) of the damping member 31 or 32 relative to a charging range L1 (see FIG. 3). As shown, the damping member 31 or 32 damped vibration to a non-offensive level when the axial dimension L2 was 60% of the charging range L1 or above. More specifically, as shown in FIG. 7, the damping effect noticeably varies between the ratios L2/L1 of 50% and 60%, but does not do so when the ratio L2/L1 exceeds 60%. This was determined with various damping members different in tan δ and weight although the damping effect was dependent on tan δ and weight. In the illustrative embodiment, the axial dimension L2 is selected to be 60% of the dimension L1 or above.

FIG. 8 shows a relation between acoustic power and the thickness t of the hollow cylindrical damping member 32 determined by experiments. As shown, the damping member 32 reduced vibration to a non-offensive level when the thickness t was 4 mm or above. More specifically, as shown in FIG. 8, the damping effect noticeably varies between the thicknesses t of 3 mm and 4 mm, but does not do so when the thickness exceeds 4 mm. This was also determined with various damping members different in tan δ and weight. In the illustrative embodiment, the thickness t is selected to be 4 mm or above.

The hollow cylindrical damping member needs a smaller amount of material and therefore a lower cost than the cylindrical damping member. It is, of course, necessary to adequately select the loss tangent tan δ and the weight, axial dimension and wall thickness of the hollow cylindrical damping member.

The cylindrical or the hollow cylindrical damping member may be provided with an outside diameter slightly greater than the inside diameter of the drum 25 and press-fitted in the drum 25. Alternatively, the damping member may be provided with an outside diameter slightly smaller than the inside diameter of the drum 25 and adhered to the drum 25. A sufficient damping effect is achievable with either one of such methods. As for press fitting, assume that the inside diameter of the drum 25 and the outside diameter of the damping member are D and d, respectively. Then, a diameter d smaller than a diameter D would prevent the damping member from closely contacting the drum 25 and would therefore obstruct vibration damping and noise reduction. On the other hand, a diameter d far greater than a diameter D would need an excessive force to fit the damping member in the drum 25 and would therefore obstruct easy assembly while causing the drum 25 to deform during assembly. In the illustrative embodiment, the diameter d is confined in the range of $D \leq d \leq D+1$ mm.

Figure 9B:
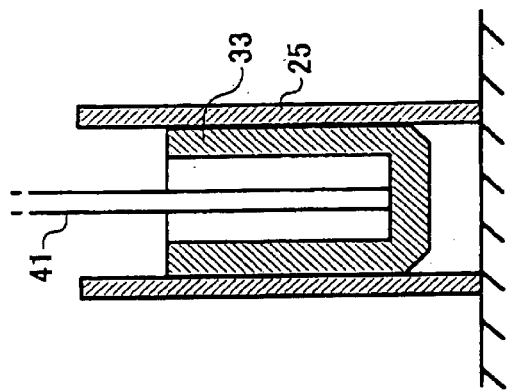
FIGS. 9A and 9B shows another specific configuration of the hollow cylindrical damping member.
Figure 9A:
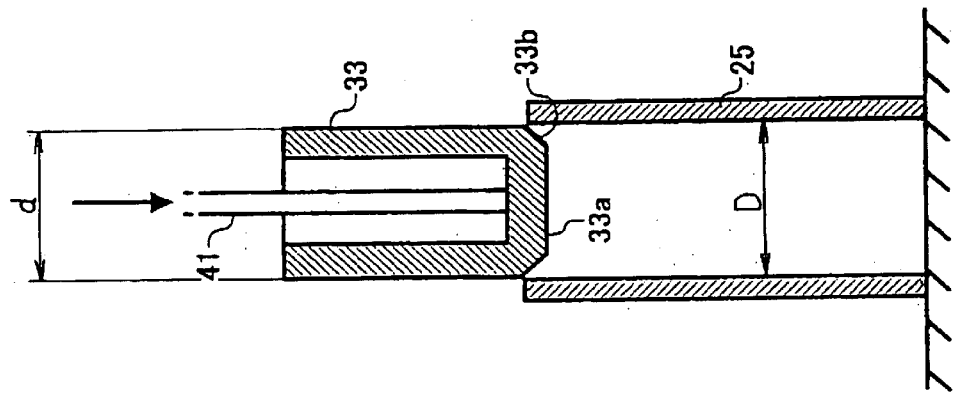

Reference will be made to FIGS. 9A and 9B for describing another specific configuration of the hollow cylindrical damping member. As shown, a damping member 33 has an outside diameter slightly (1 mm or less) greater than the inside diameter of the drum 25. The damping member 33 is closed by an end wall 33a at one end and open at the other end. As shown in FIG. 9A, to insert the damping member 33 into the drum 25, the drum 25 is positioned upright on a suitable base while the damping member 33 is put on the end of the drum 25. Subsequently, a jig 41 is inserted into the damping member 33 and pressed against the end wall 33a. As shown in FIG. 9B, the jig 41 and therefore the damping member 33 is forced into the drum 25. At this instant, the apparent outside diameter of the damping member 33 is reduced due to friction, so that the damping member 33 can be easily press-fitted in the drum 25.

The damping member 33 achieves the same advantages as the hollow cylindrical damping member 32 described with reference to FIG. 5. Again, the axial dimension L2 of the damping member should preferably be 60% of the charging range L1 or above while the wall thickness t should preferably be 4 mm or above.

The end wall 33a may be formed with a hole so sized and positioned as not to obstruct the insertion of the damping member 33 into the drum 25. At the time of molding, the hole will prevent a mold for forming the hollow portion of the damping member from tilting and making the wall thickness irregular.

The damping member 33 has a reduced diameter portion 33b at its end where the end wall 33b is positioned. The reduced diameter portion 33b may be provided with a linearly tapered section or a curved section. When the damping member 33 is put on the end of the drum 25, the reduced diameter portion 33b will allow the center of the damping member 33 to be easily aligned with the center of the drum 25.

The reduced diameter portion stated above is similarly applicable to the cylindrical damping member. Specifically, as shown in FIG. 4, the cylindrical damping member 31 may be formed with reduced diameter portions 31a at both ends thereof for the above-described purpose. The reduced diameter portion may be formed only at one end of the damping member 31, in which case the damping member 31 will, of course, be inserted into the drum 25 with the reduced diameter portion at the head.

Figure 10A:
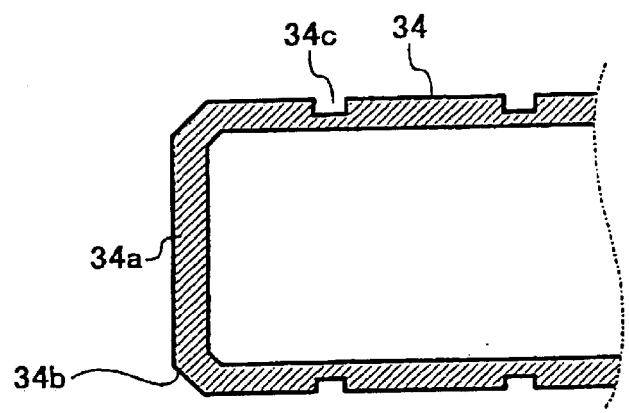
FIGS. 10A and 10B are respectively a section and a side elevation showing a specific configuration of a damping member whose surface contacting the inner periphery of the drum is not continuous.
Figure 10B:
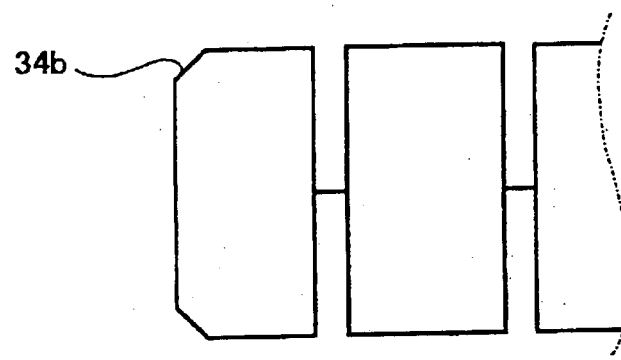
Figure 11A:
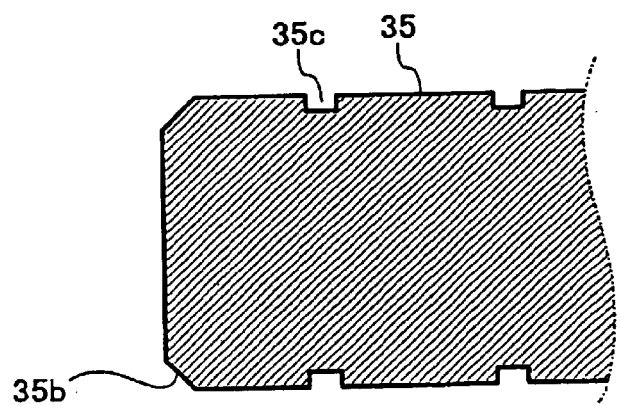
FIGS. 11A and 11B are views similar to FIGS. 10A and 10B, showing another specific configuration of the damping member with a discontinuous surface.
Figure 11B:
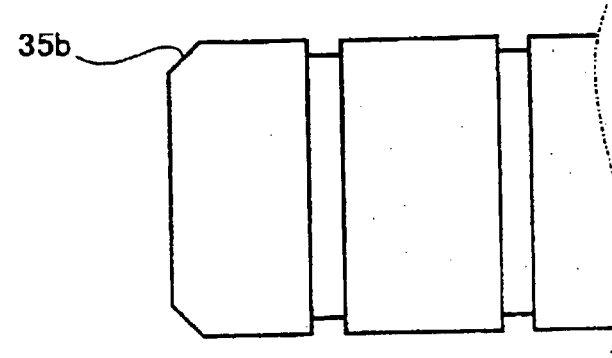

The outer periphery of the damping member expected to contact the inner periphery of the drum 25 does not have to be continuous as will be described with reference to FIGS. 10A, 10B, 11A, and 11B. FIGS. 10A and 10B show a hollow cylindrical damping member 34 having reduced diameter portions 34b and end wall 34a, while FIGS. 11A and 11B show a cylindrical damping member 35 having reduced diameter portions 35b. As shown, the damping members 34 and 35 are formed with annular recesses 34c and annular recesses 35c, respectively. The discontinuous outer periphery of the damping member 34 or 35 allows the damping member 34 or 35 to be easily inserted into the drum 25 with a minimum of resistance. Also, the recesses 34c or 35c further reduce the amount of material required and therefore the cost. The annular recesses 34c and 35c each may be replaced with a spiral recess or spiral recesses, if desired.

Figure 12:
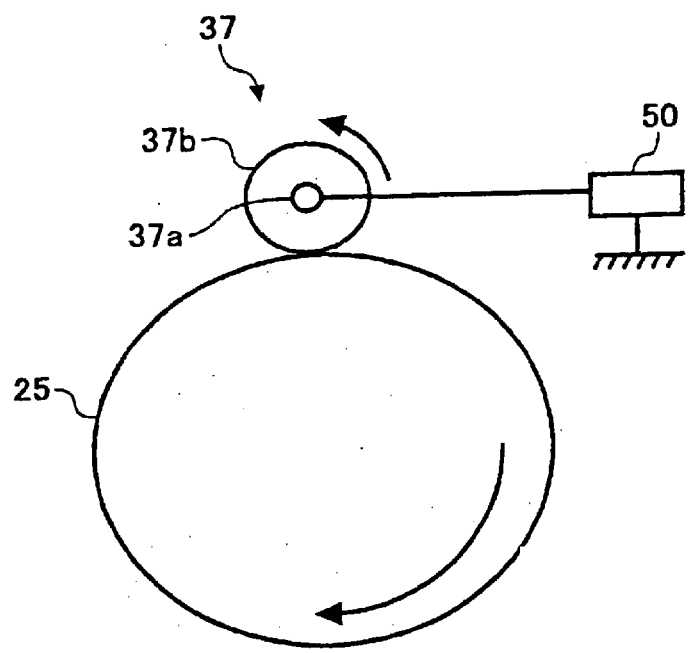
FIG. 12 is a side elevation showing a specific contact type charger using a charge roller.
Figure 13:
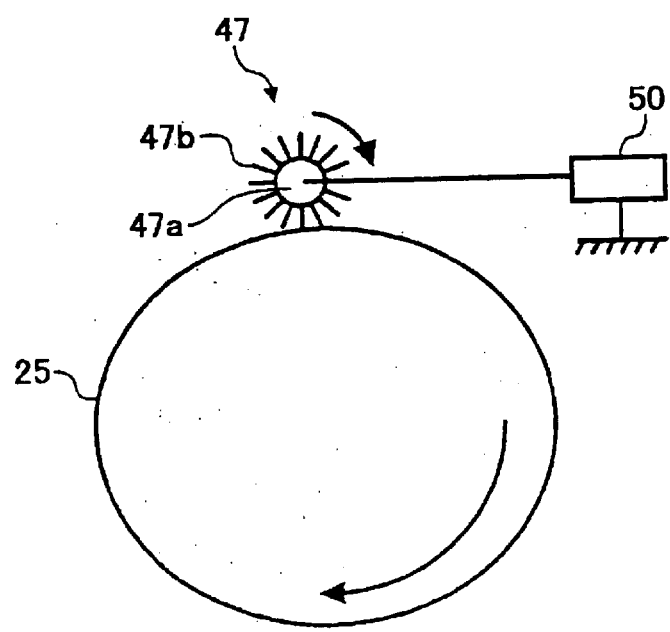
FIG. 13 is a side elevation showing another specific contact type charger using a fur brush.
Figure 14:
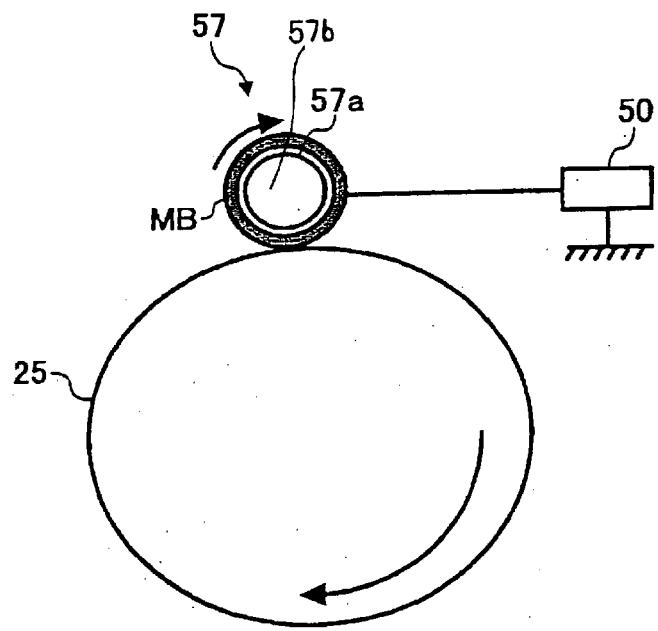
FIG. 14 is a side elevation showing a further specific contact type charger using a magnet brush.

FIGS. 12 through 14 each show a particular image forming apparatus of the type using a contact type charger and to which the present invention is applied. As shown, the image forming apparatuses shown in FIGS. 12 through 14 include a charge roller 37, a brush roller 47, and a magnet brush charger 57, respectively. The configurations shown in FIGS. 12 through 14 are identical with each other except for the charger, and basically identical with the configuration using a non-contact type charger described with reference to FIGS. 1 through 9B.

In FIG. 12, the drum 25 rotates clockwise, as indicated by an arrow, at a preselected speed (process speed). The charge roller 37 is held in contact with the drum 25 and made up of a core 37a and a conductive rubber layer 37b covering the core 37a. Opposite ends of the core 37a is rotatably supported by, e.g., bearings and pressed against the drum 25 by pressing means not shown. In this configuration, the charge roller 37 is rotated by the drum 25. The core 37a has a diameter of 9 mm while the conductive rubber layer 37b has medium resistance of about $1 \times 10^5$ Ω cm. The total diameter of the charge roller 37 is selected to be 16 mm. A power supply 50 is connected to the core 37a so as to apply a preselected bias to the charge roller 37. In this condition, the charge roller 37 uniformly charges the surface of the drum 25 to preselected polarity and potential.

Any one of the damping members 31, 32, 33, 34 and 35 described with reference to FIGS. 9A, 9B, 10A, 10B, 11A and 11B is disposed in the drum 25. Therefore, even when the charge roller or contact type charger 27 is used and when an AC-biased DC voltage is applied as a bias, the drum 25 is free from resonance. This, coupled with the fact that the vibration of the cleaning blade is not transferred, successfully reduces noise.

In FIG. 13, the brush roller 47 is made up of a core 47a and a fur brush 47b provided on the core 47a. The brush roller 47 is pressed against the drum 25 by preselected pressure against the elasticity of the fur brush 47b, forming a preselected nip between the brush roller 47 and the drum 25. The fur brush 47b is processed for conduction by use of, e.g., carbon, copper sulfide, metal or metal oxide. The brush 47a is wrapped around or adhered to the core 47a formed of metal or processed for conduction.

More specifically, in FIG. 13, the core 47a is formed of metal and provided with a diameter of 6 mm. For the fur brush 47b, a tape of pile implemented by conductive rayon filaments REC-B (trade name) available from UNITIKA LTD. is spirally wrapped around the core 47a. The brush roller 47 has a total outside diameter of 14 mm and a length of 250 mm in the axial direction. The filaments have a size of 300 denier for fifty filaments and arranged in a density of 155 filaments for 1 mm square. The roll brush was inserted into a pipe having an inside diameter of 12 mm while being rotated in one direction, so that the brush and pipe became coaxial. The roll brush was then left in the pipe in a hot, humid atmosphere in order to tilt the filaments.

The brush roller 47 has a resistance of $1 \times 10^5$ Ω for a voltage of 100 V applied thereto. The resistance was determined in terms of a current flown through the brush roller 47 when a voltage of 100 V was applied to the roller 47 contacting a metallic drum with a diameter of 30 mm over a nip width of 3 mm.

The resistance of the brush roller 47 should be $10^4$ Ω or above in order to prevent an excessive leak current from flowing into pin holes or similar defects, which may exist in the drum 25, and bringing about defective charging at the nip. Further, to insure sufficient charge injection in the drum surface, the resistance should be $10^7$ Ω or below.

For the filaments of the fur brush 47b, use may also be made of REC-C, REC-M1 or REC-M10 available from UNITIKA LTD., SA-7 available from TORAY INDUSTRIES INC., Thunderon available from Nihon Sanmo Dyeing Co., Ltd. or Kuracarbo available from KURARAY CO. LTD. by way of example. The filaments should preferably be 3 denier to 10 denier each and arranged in bundles each having ten to 100 filaments in a density of eighty filaments to 600 filaments for a millimeter. The filament should preferably be 1 mm to 10 mm long each.

The brush roller 47 rotates at a preselected peripheral speed in a direction counter to the direction of rotation of the drum 25; the peripheral speed differs from the peripheral speed of the drum 25. A power supply 50 applies a preselected voltage to the brush roller 47, causing the brush roller 47 to uniformly charge the surface of the drum 25. In this specific configuration, the brush roller 47 charges the drum 25 mainly by direct charge injection, so that the surface potential of the drum 25 is substantially the same as the voltage applied to the brush roller 47.

In FIG. 13, too, any one of the damping members 31, 32, 33, 34 and 35 described with reference to FIGS. 9A, 9B, 10A, 10B, 11A and 11B is disposed in the drum 25. Therefore, even when the brush roller or contact type charger 47 is used and when an AC-biased DC voltage is applied as a bias, the drum 25 is free from resonance. This, coupled with the fact that the vibration of the cleaning blade is not transferred, successfully reduces noise.

In FIG. 14, the magnet brush charger 57 adjoins the drum 25 and is made up of a nonconductive sleeve 57a supporting a magnet brush MB and a magnet roller 57b disposed in the sleeve 57a. The magnet brush MB is held in contact with the drum 25 over a preselected nip width. The magnet brush MB may be implemented by any suitable ferrite grains, e.g., Zn—Cu ferrite grains. In the specific configuration shown in FIG. 14, the magnet brush or contact type charging member MB is implemented by a mixture of Zn—Cu ferrite grains with a mean grain size of 25 μm and Zn—Cu ferrite grains with a mean grain size of 10 μm; the mixture ratio is 1:0.05. The ferrite grains with the mean grain size of 25 μm contained in the mixture each are coated with a medium-resistance resin layer and then coated on the sleeve 57a to a thickness of 1 mm. The magnetic force of the magnet roller 57b causes such magnetic grains to deposit on the sleeve 57a.

In FIG. 14, the magnet brush MB formed a nip between it and the drum 25 over a width of about 5 mm in the direction of rotation. The sleeve 57a and drum 25 were spaced from each other by about 500 μm. The sleeve 57a was rotated at a peripheral speed two times as high as that of the drum 25 in the counter direction, causing the magnet brush MB to uniformly contact the drum 25. The power supply 50 applied a bias to the sleeve 57a for thereby causing the sleeve 57a to uniformly charge the surface of the drum 25 via the magnet brush MB.

In FIG. 14, too, any one of the damping members 31, 32, 33, 34 and 35 described with reference to FIGS. 9A, 9B, 10A, 10B, 11A and 11B is disposed in the drum 25. Therefore, even when the magnet brush charger or contact type charger 57 is used and when an AC-biased DC voltage is applied as a bias, the drum 25 is free from resonance. This, coupled with the fact that the vibration of the cleaning blade is not transferred, successfully reduces noise.

If the damping member is far lighter than the charging member, then the damping member fails to fully dampen the vibration of the drum. In light of this, the damping members described above should preferably have a weight that is 70% of the weight of the charging member (e.g. charge roller) or above each. This is also true with the damping member applied to the non-contact type charging member spaced from the drum.

Further, the expected damping effect is not achievable if the volume of the damping member disposed in the drum is small. In light of this, each damping member should preferably have a volume that is 30% of the volume of the drum or above.

Moreover, if the damping member is excessively hard, then it is apt to deform the drum when inserted into the drum. In light of this, the damping member should have a hardness of 30° to 70° in the JIS scale.

The configuration of the drum or image carrier will be described in detail hereinafter. The drum for electrophotography may be formed of selenium amorphous silicon or similar inorganic semiconductor, an organic semiconductor or a mixture thereof, as well known in the art. In recent years, organic semiconductors are predominant over inorganic semiconductors because of low cost, free design, non-pollution and so forth although the damping members described above are practicable with either one of organic and inorganic semiconductors.

Organic photoconductors for electrophotography include resins, typically polyvinyl carbazole (PVK), charge transfer complex type photoconductors, typically PVK-TNF (2,3,7-trinitrofluorene), pigment dispersion type photoconductors, typically phthalocyanine binder, and split-function type photoconductors that are the mixtures of charge generating substances and charge transporting substances. Split-function type photoconductors, among others, are attracting attention.

How a split-function type photoconductor allows a latent image to be formed will be described hereinafter. When a light beam scans the charged surface of the photoconductor, the light beam is passed through a transparent, charge transport layer and then absorbed by a charge generating substance forming a charge generation layer. The charge generating substance absorbed the light beam generates a charge carrier. The charge carrier is injected into the charge transport layer and then migrates through the charge transport layer. As a result, the charge on the surface of the photoconductor is neutralized and forms a latent image. As for this type of photoconductor, the combination of a charge transporting substance mainly absorbent of ultraviolet rays and a charge generating substance mainly absorbent of visible rays is known and effective.

The problem with an organic photoconductor is that it lacks mechanical and chemical durability. While many of charge transporting substances have been developed in the form of low molecular weight compounds, such compounds lack a film-forming ability alone and are therefore usually dispersed in or mixed with inactive high polymer molecules. Therefore, a charge transport layer formed of a low molecular weight compound and inactive high polymer molecules is generally soft and low in mechanical durability. Mechanical loads ascribable to various contact members including a developing sleeve, a sheet, a cleaning brush and a cleaning blade are apt to shave off the above charge transport layer during repeated operation.

To solve the above problem, a protective layer containing a filler is sometimes formed on the photoconductive layer for protecting it while enhancing durability. For example, as shown in FIG. 4, the photoconductive layer 25-1a is provided on the hollow cylinder 25-1 and the protection layer 25-1b is provided on the photoconductive layer 25-1a. The photoconductive layer 25-1a has a thickness of 0.75 mm, and the protection layer also has a thickness of 0.75 mm or less. For the protection layer, use may be made of any suitable resin, e.g., ABS resin, ACS resin, olefin-vinyl monomer copolymer, chlorinated polyether resin, allyl resin, phenolic resin, polyacetal resin, polyamide resin, polyamideimide resin, polyacrylate resin, polyallyl sulfone resin, polybutylene resin, polybutylene terephthalate resin, polycarbonate resin, polyether sulfone resin, polyethylene resin, polyethylene terephalate resin, polyimide resin, acrylic resin, polymethyl pentene resin, polypropylene resin, polyphenylene oxide resin, polysulfone resin, AS resin, AB resin, BS resin, polyurethane resin, polyvinyl chloride resin, polyvinylidene chloride, and epoxy resin.

The protection layer may contain a filler for enhancing wear resistance. The filler may be implemented by polytetrafluoroethylene or similar fluorocarbon resin or silicone resin with or without titanium oxide, tin oxide, potassium titanate, silica, alumina or similar inorganic substance dispersed therein. The filler content of the protection layer is usually 10% to 40% in weight, preferably 20% to 30%. If the filler content is less than 10%, then the protection layer wears soon and lacks durability. If the filler content is more than 40% then potential in a light portion noticeably increases at the time of exposure, resulting in a decrease in sensitivity.

Further, the protection layer may contain a dispersing agent customarily with, e.g., paints. The dispersing agent is usually contained in the protection layer in a content of 0.5% to 4%, preferably 1% to 2%, in weight with respect to the amount of filler.

The protection layer may additionally contain a charge transporting material and/or an antioxidant. To form the protection layer, use is made of spraying or similar conventional coating method. The protection layer should preferably be 0.5 µm to 10 µm thick, more preferably 4 µm to 6 µm thick.

The drum to which the present invention is applied may have an intermediate layer between the photoconductive layer and the protection layer. Generally, the major component of the intermediate layer is binder resin. The binder resin may be any one of polyamide, alcohol-soluble nylon, water-soluble polyvinyl butyral, and polyvinyl alcohol. The intermediate layer is also coated by any conventional method. The intermediate layer should preferably be 0.05 µm to 2 µm thick. Specific examples of the drum will be described hereinafter.

EXAMPLE 1

There were prepared an aluminum drum having a diameter of 30 mm, a coating liquid for forming an under layer, a coating liquid for forming a charge generation layer, and a coating liquid for forming a charge transport layer. The coating liquid for forming an under layer consisted of 6 parts by weight of alkyd resin Beckozole 1307-60-EL (trade name) available from DAINIPPON INK & CHEMICALS, INC., 4 parts by weight of melamine resin Super Beckamine G-821-60 (trade name) also available from DAINIPPON INK & CHEMICALS, INC., 40 parts by weight of titanium oxide, and 200 parts by weight of methyl ethyl ketone.

Figure 15:
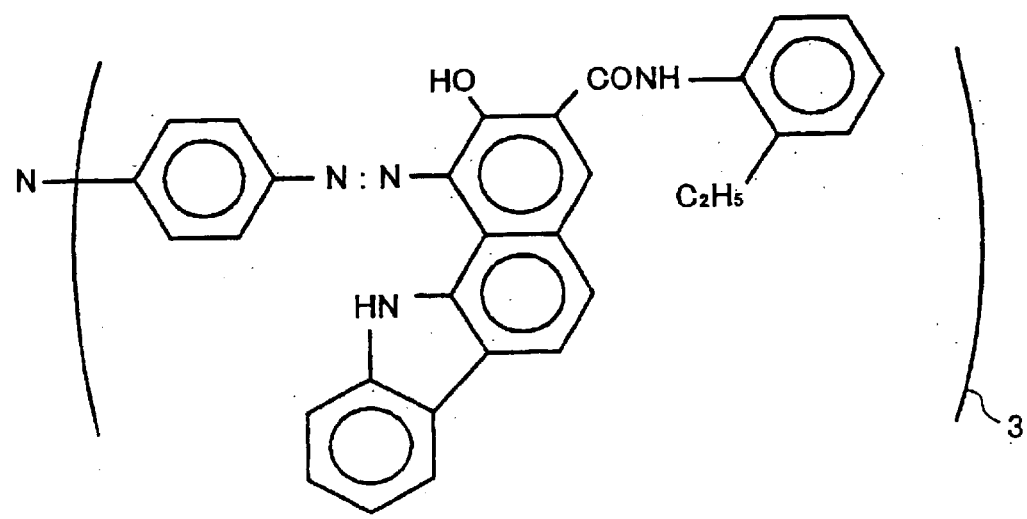
FIGS. 15 through 17 show chemical formulae representative of coating liquids that form a charge generation layer, a charge transport layer and a protection layer, respectively.
Figure 16:
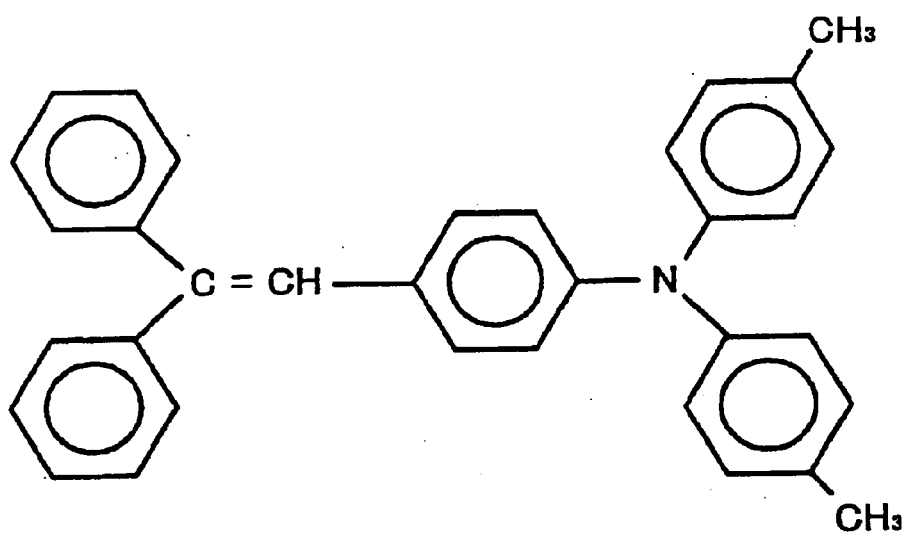

The coating liquid for forming a charge generation layer consisted of 2.5 parts by weight of trisazo pigment having a structure shown in FIG. 15, 0.25 part by weight of polyvinyl butyral (UCC:XYHL), 200 parts by weight of cyclohexanone, and 80 parts by weight of methyl ethyl ketone. Further, the coating liquid for forming a charge transport layer consisted of 10 parts by weight of bisphenol A polycarbonate Panlite K1300 (trade name) available from TEIJIN LTD., 10 parts by weight of low-molecule charge transporting substance having a structure shown in FIG. 16, and 100 parts by weight of methylene chloride.

The above coating liquids were sequentially coated on the aluminum drum and dried to form a 3.5 µm thick under layer, a 0.2 µm thick charge generation layer, and a 25 µm thick charge transport layer, thereby producing a drum #1 for estimation.

EXAMPLE 3

Figure 17:
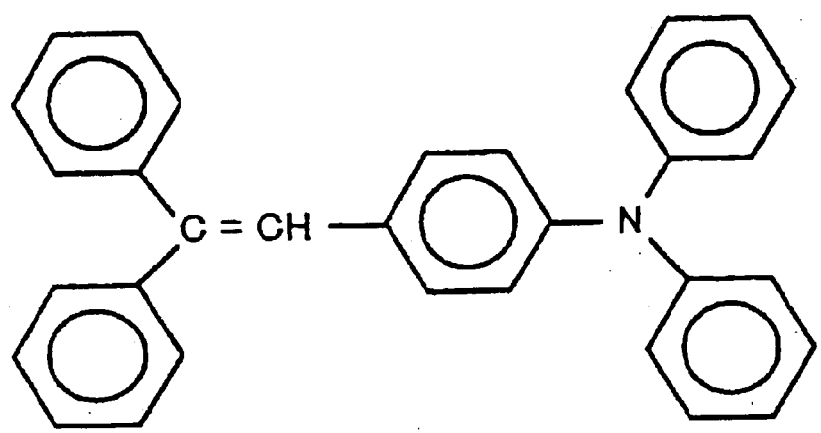

A drum #3 for estimation identical with the drum #1 except for the addition of a 2 µm thick protection layer was produced. To form the protection layer on the charge transport layer, use was made of a coating liquid consisting of 2 parts by weight of a charge transporting substance having a structure shown in FIG. 17, 4 parts by weight of A polycabonate, 100 parts by weight of methylene chloride.

EXAMPLE 4

A drum #4 for estimation identical with the drum #1 except for the addition of a 2 µm thick protection layer was produced. To form the protection layer on the charge transport layer, use was made of a coating liquid consisting of 4 parts by weight of a charge transporting substance having a structure shown in FIG. 16, 4 parts by weight of A polycarbonate, 1 part by weight of titanium oxide, and 100 parts by weight of methylene chloride.

EXAMPLE 5

A drum #5 for estimation was identical with the drum #4 except that titanium oxide dispersed in the protection layer was replaced with aluminum oxide.

FIG. 18 lists the results of experiments conducted with Examples 1 through 5 and Comparative Examples 1 through 12 by using a digital copier Imagio MF200 (trade name) available from RICOH CO., LTD. Example 2 and Comparative Examples 1 through 12 will not be described specifically. In FIG. 18, an F/C ratio refers to a ratio of fluorine atoms to carbon atoms present on the surface of each drum and is used as an index representative of the amount of fluorine material deposited on the surface of the drum. "Δd" indicates an amount by which the thickness of the photoconductive layer decreased from the initial value due to the running of the copier. A double circle and a circle respectively indicate "excellent" and "good" as determined by the total estimation of image density, resolution and so forth. "Δ1" and "Δ2" and "Δ3" respectively indicate some decrease in image density, some stripes and background contamination, and some blurring of an image. Further, "x1", "x2" and "x3" respectively indicate conspicuous decrease in image density, conspicuous stripes and background contamination, and conspicuous blurring.

As FIG. 18 indicates, Examples 1 through 5 were capable of producing high-definition hard copies over a long period of time.

When any one of the damping members stated earlier was mounted to any one of the drums #1 through #5, it successfully reduced the resonance of the drum and obviated the transfer of vibration of the cleaning blade, thereby obviating noise. This was true even when the non-contact type charger (including proximity type charger) or the contact type charger was used and applied with an AC-biased DC voltage.

It is to be noted that the damping member may be formed of any suitable material other than the previously stated materials so long as it satisfies the loss tangent tan δ. The present invention is, of course, applicable even to a color image forming apparatus including a single photoconductive element or a monochromatic image forming apparatus. The image forming apparatus may be implemented as a copier, facsimile apparatus, a facsimile apparatus or a printer, as desired.

In summary, it will be seen that the present invention provides an image carrier and a damping member having various unprecedented advantages, as enumerated below.

(1) Even when an AC-biased DC voltage is applied to a charger, the damping member prevents the image carrier from resonating and prevents the vibration of a cleaning blade from being transferred to thereby reduced noise.

(2) The damping member increases the weight of the image carrier to thereby shift the resonance frequency of the image carrier to the low frequency side when implemented as a hollow cylinder. This effectively reduces offensive high-frequency noise as well as cost. In addition, the damping member prevents the image carrier from deforming.

(3) The damping member easily achieves a required loss tangent at low cost when formed of rubber or resin.

(4) The damping member can be easily positioned and inserted into the image carrier at the time of assembly.

(5) A protection layer formed on the image carrier enhances the durability of the image carrier.

(6) The charger can uniformly charge the surface of the image carrier.

Various modifications will become possible for those skilled in the art after receiving the teachings of the present disclosure without departing from the scope thereof.

What is claimed is:

1. An image carrier for an image forming apparatus that uniformly charges a photoconductive layer of said image carrier and electrostatically forms a latent image on said photoconductive layer with a light beam, said image carrier comprising:
   a hollow cylindrical core having a thin wall, the photoconductive layer being formed on a surface of said core; and
   a damping member fitted in a bore of said core and formed of an elastic material having a loss tangent tan δ of at least 0.5;
   wherein said damping member has a weight that is at least 70% of a weight of a charging member that charges said image carrier.

2. The image carrier as claimed in claim 1, wherein said damping member is cylindrical.

3. The image carrier as claimed in claim 2, wherein a rigid body is inserted in a bore of a cylindrical bore of said damping member.

4. The image carrier as claimed in claim 3, wherein said damping member has a wall thickness of 4 mm or above.

5. The image carrier as claimed in claim 1, wherein said damping member is a hollow cylinder and is formed of a material having a loss tangent tan δ of at least 0.6.

6. The image carrier as claimed in claim 5, wherein one end of said damping member in an axial direction is closed by an end wall.

7. The image carrier as claimed in claim 6, wherein an outer circumference of said end wall is reduced in diameter.

8. The image carrier as claimed in claim 5, wherein said damping member comprises an elastic round sheet.

9. The image carrier as claimed in claim 8, wherein a seam or an overlapping portion where opposite edges of the sheet meet is not parallel to an axis of said damping member.

10. The image carrier as claimed in claim 1, wherein said damping member is press-fitted in said core of said image carrier.

11. The image carrier as claimed in claim 1, wherein said damping member is adhered to said core of said image carrier.

12. The image carrier as claimed in claim 1, wherein said damping member has a volume that is at least 30% of a volume of said image carrier.

13. The image carrier as claimed in claim 1, wherein said damping member has a hardness of 30° to 70° in terms of a JIS (Japanese Industrial Standards) scale.

14. The image carrier as claimed in claim 1, wherein said damping member has a length that is at least 60% of an axial length of a charging range for charging said image carrier.

15. The image carrier as claimed in claim 1, wherein assuming that said core of said image carrier has an inside diameter of D, and that said damping member has an outside diameter of d, then there holds a relation of $D \leq d \leq (D+1)$ mm.

16. The image carrier as claimed in claim 1, wherein said damping member is formed of rubber.

17. The image carrier as claimed in claim 1, wherein said damping member is formed of resin.

18. The image carrier as claimed in claim 1, wherein at least one of opposite ends of said damping member in an axial direction has an outer circumference reduced in size.

19. The image carrier as claimed in claim 1, wherein said damping member is formed with recesses in a surface thereof contacting an inner periphery of said core of said image carrier.

20. The image carrier as claimed in claim 1, wherein a protection layer is formed on said photoconductive layer.

21. The image carrier as claimed in claim 20, wherein said protection layer contains a filler.

22. The image carrier as claimed in claim 20, wherein said protection layer contains a charge transporting substance.

23. The image carrier as claimed in claim 1, wherein said image carrier is charged by a non-contact type charging system.

24. The image carrier as claimed in claim 23, wherein an AC-biased DC bias is used to charge said image carrier.

25. The image carrier as claimed in claim 1, wherein said image carrier is charged by a proximity type charging system.

26. The image carrier as claimed in claim 1, wherein said image carrier is charged by a contact type charging system.

27. The image carrier as claimed in claim 26, wherein the contact type charging system uses a magnet brush.

28. In a process cartridge comprising at least a photoconductive element for an electrophotographic process, said photoconductive element comprising:
   a hollow cylindrical core having a thin wall, a photoconductive layer being formed on a surface of said core; and
   a damping member fitted in a bore of said core and formed of an elastic material having a loss tangent tan δ of at least 0.5, wherein
   said damping member has a weight that is at least 70% of a weight of a charging member that charges said image carrier.

29. In an image forming apparatus on which an image carrier is mounted, said image carrier comprising:
   a hollow cylindrical core having a thin wall, a photoconductive layer being formed on a surface of said core; and
   a damping member fitted in a bore of said core and formed of an elastic material having a loss tangent tan δ of at least 0.5, wherein
   said damping member has a weight that is at least 70% of a weight of a charging member that charges said image carrier.

30. A damping member fitted in an image carrier, which is included in an image forming apparatus, and formed of an elastic material having a loss tangent tan δ of at least 0.5, wherein
   said damping member has a weight that is at least 70% of a weight of a charging member that charges said image carrier.

31. The damping member as claimed in claim 30, wherein said damping member is cylindrical.

32. The damping member as claimed in claim 30, wherein said damping member is a hollow cylinder and has a loss tangent tan δ of at least 0.6.

33. The damping member as claimed in claim 32, wherein a rigid member is inserted in said damping member.

34. The damping member as claimed in claim 32, wherein one of opposite ends of said damping member in an axial direction is closed by an end wall.

35. The damping member as claimed in claim 34, wherein an outer circumference of said end wall is reduced in diameter.

36. The damping member as claimed in claim 32, wherein said damping member comprises an elastic round sheet.

37. The damping member as claimed in claim 36, wherein a seam or an overlapping portion where opposite edges of the sheet meet is not parallel to an axis of said damping member.

38. The damping member as claimed in claim 32, wherein said damping member has a wall thickness of 4 mm or above.

39. The damping member as claimed in claim 32, wherein said damping member is formed with recesses in a surface thereof contacting an inner periphery of the image carrier of the image forming apparatus.

40. The damping member as claimed in claim 30, wherein said damping member has a volume that is at least 30% of a volume of the image carrier.

41. The damping member as claimed in claim 30, wherein said damping member has a hardness of 30° to 70° in terms of a JIS hardness scale.

42. The damping member as claimed in claim 30, wherein said damping member has a length that is at least 60% of an axial length of a charging range, which charges the image carrier.

43. The damping member as claimed in claim 30, wherein assuming that the image carrier has an inside diameter of D, and that said damping member has an outside diameter of d, then there holds a relation of $D \leq d \leq (D+1 \text{ mm})$.

44. The damping member as claimed in claim 30, wherein said damping member is formed of rubber.

45. The image carrier as claimed in claim 30, wherein said damping member is formed of resin.

46. The image carrier as claimed in claim 30, wherein at least one of opposite ends of said damping member in an axial direction has an outer circumference reduced in size.

47. An image carrier for an image forming apparatus that uniformly charges a photoconductive layer of said image carrier and electrostatically forms a latent image on said photoconductive layer with a light beam, said image carrier comprising:
    a hollow cylindrical core having a thin wall, the photoconductive layer being formed on a surface of said core; and
    a damping member fitted in a bore of said core and formed of an elastic material having a loss tangent tan δ of at least 0.5, wherein
    said damping member comprises an elastic round sheet; and
    a seam or an overlapping portion where opposite edges of the sheet meet is not parallel to an axis of said damping member.

48. A damping member fitted in an image carrier, which is included in an image forming apparatus, and formed of an elastic material having a loss tangent tan δ of at least 0.5, wherein
    said damping member comprises an elastic round sheet; and
    a seam or an overlapping portion where opposite edges of the sheet meet is not parallel to an axis of said damping member.

49. An image carrier for an image forming apparatus that uniformly charges a photoconductive layer of said image carrier and electrostatically forms a latent image on said photoconductive layer with a light beam, said image carrier comprising:
    a hollow cylindrical core having a thin wall, the photoconductive layer being formed on a surface of said core; and
    a damping member fitted in a bore of said core and formed of an elastic material having a loss tangent tan δ of at least 0.5, wherein
    said damping member is formed with annular recesses in a surface thereof contacting an inner periphery of said core of said image carrier.

50. A damping member fitted in an image carrier, which is included in an image forming apparatus, and formed of an elastic material having a loss tangent tan δ of at least 0.5, wherein
    said damping member is formed with annular recesses in a surface thereof contacting an inner periphery of said core of said image carrier.

* * * * *